Oct. 21, 1947.    T. O. MEHAN ET AL    2,429,522
TRANSFER MECHANISM FOR CALCULATING MACHINES
Original Filed March 6, 1942    6 Sheets-Sheet 3
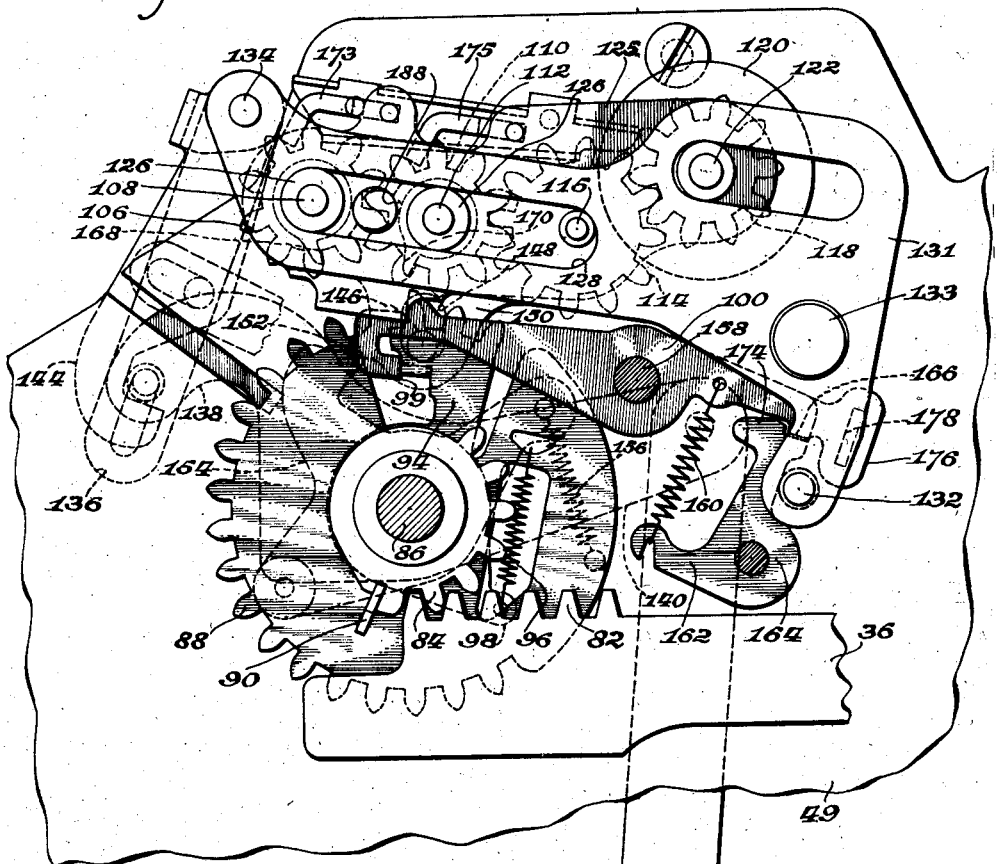
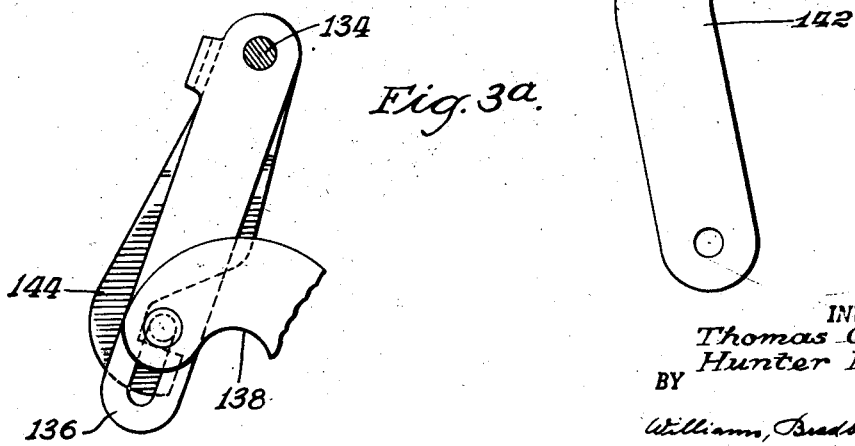
INVENTORS
Thomas O. Mehan
Hunter E. Hooe
BY
Williams, Bradbury & Hinkle
Attorneys.

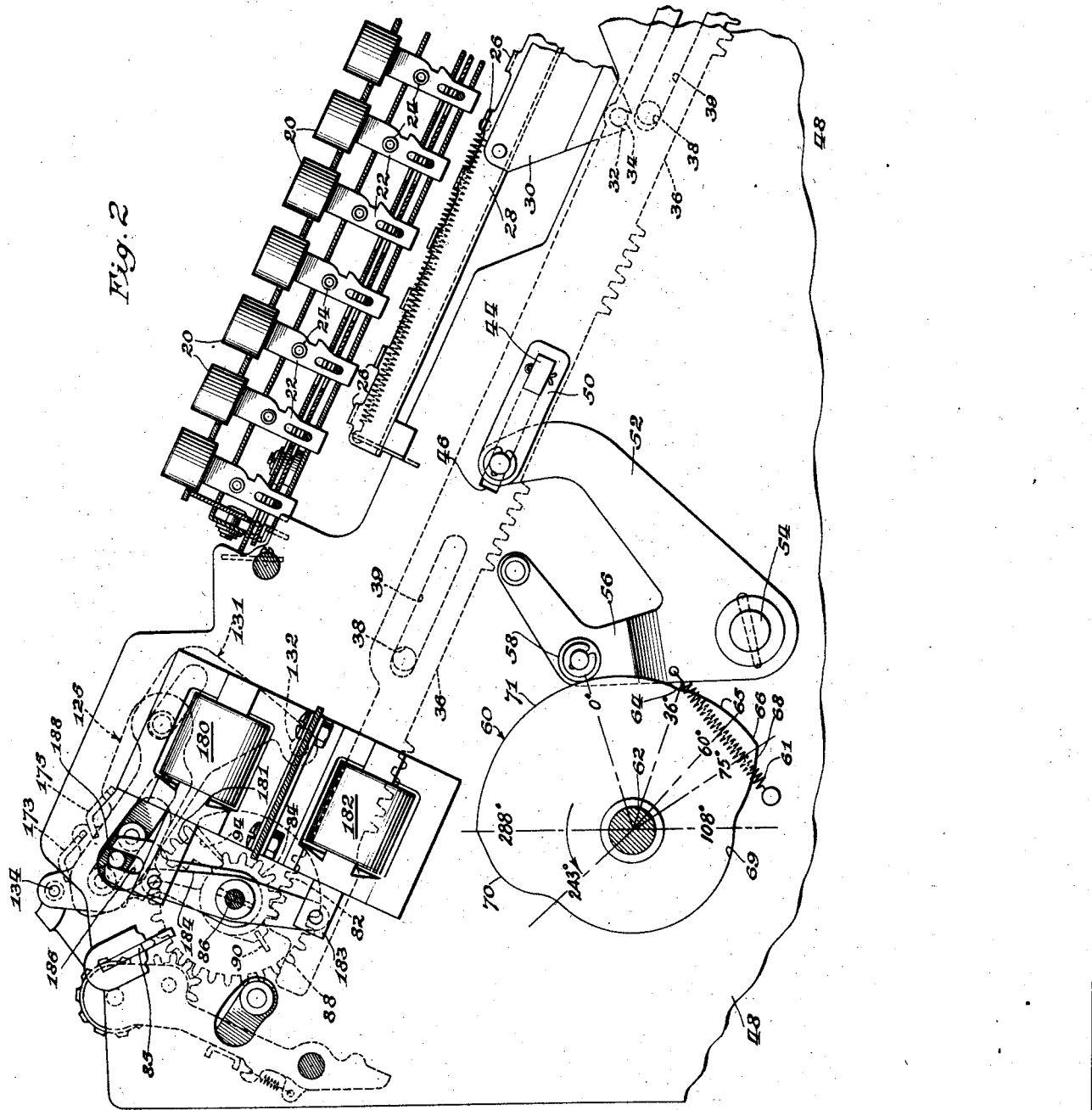

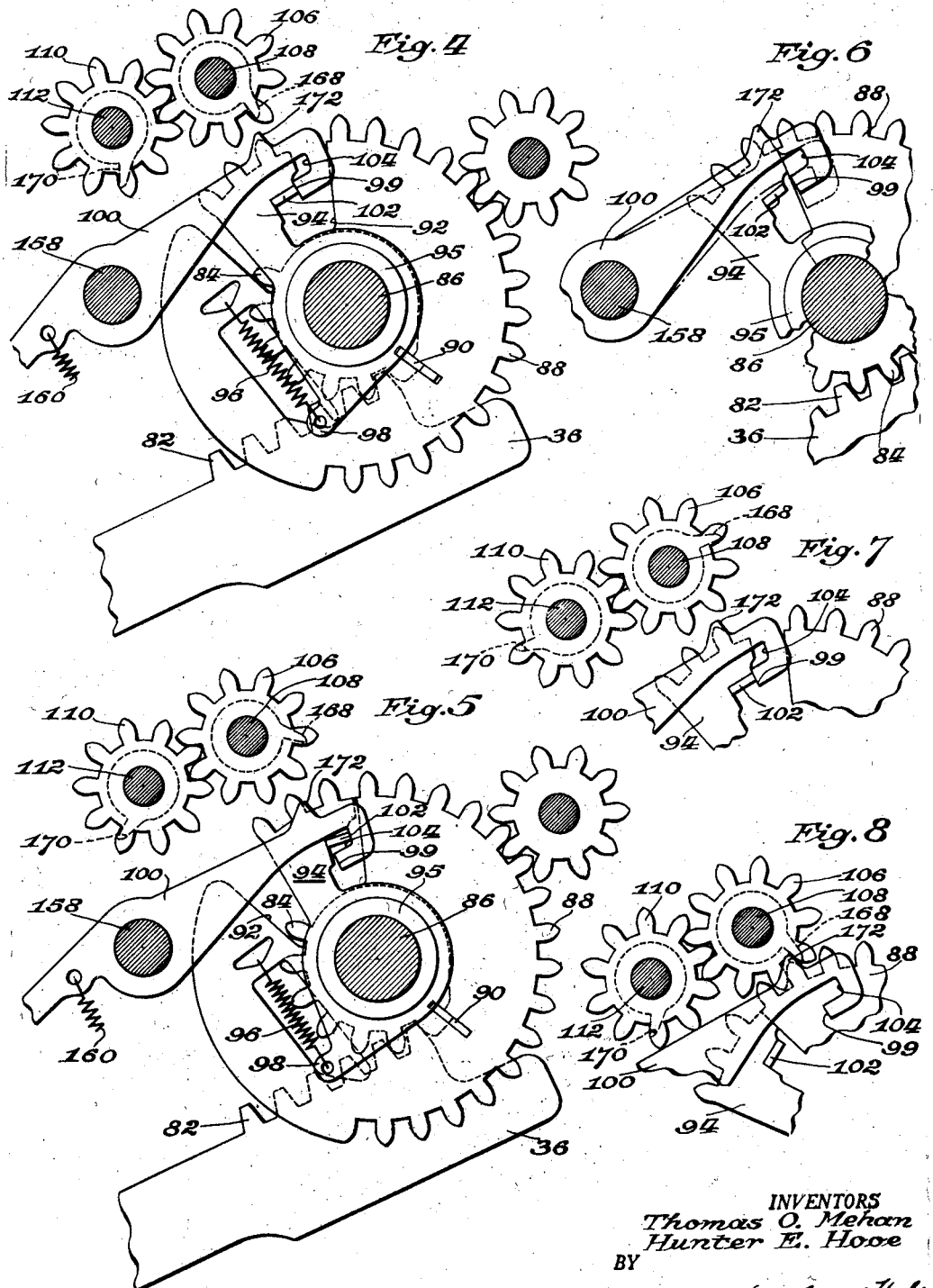

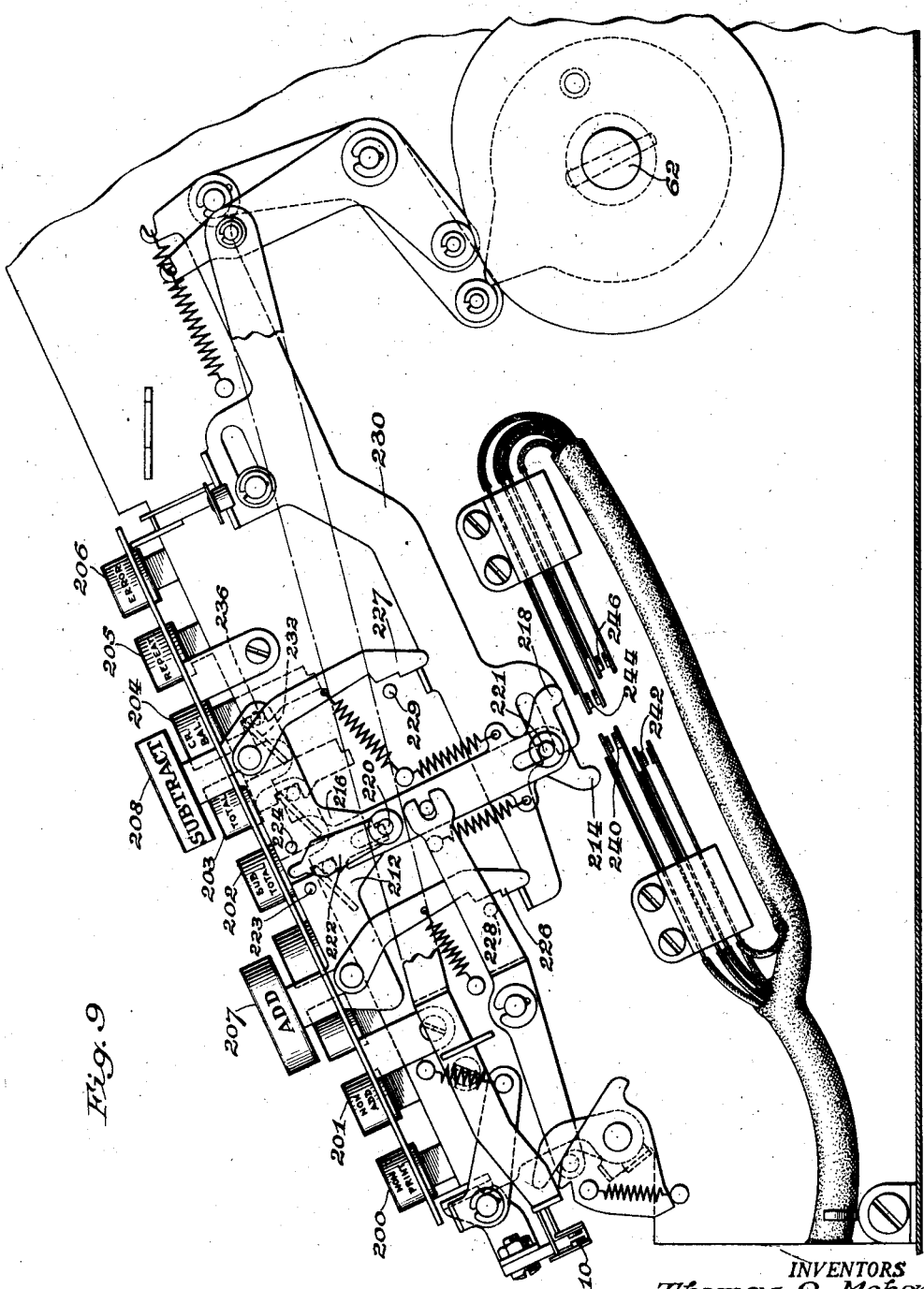

Oct. 21, 1947.　　　T. O. MEHAN ET AL　　　2,429,522
TRANSFER MECHANISM FOR CALCULATING MACHINES
Original Filed March 6, 1942　　6 Sheets-Sheet 6
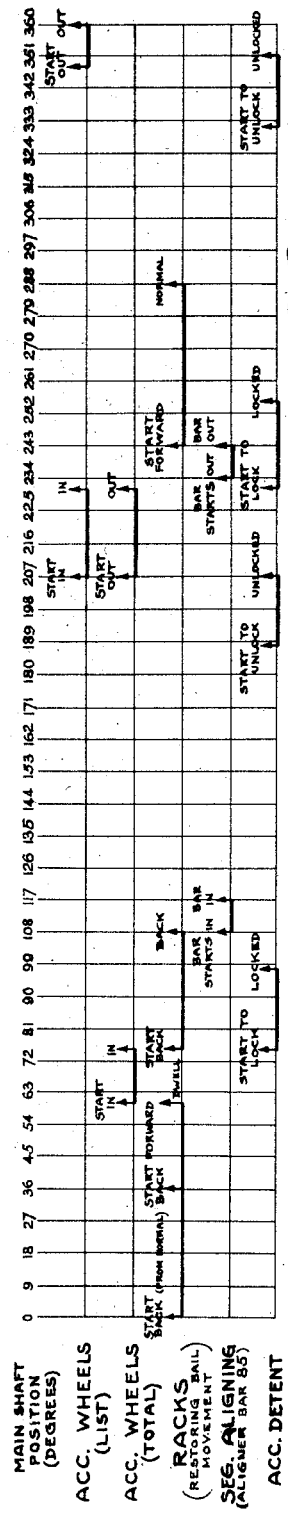
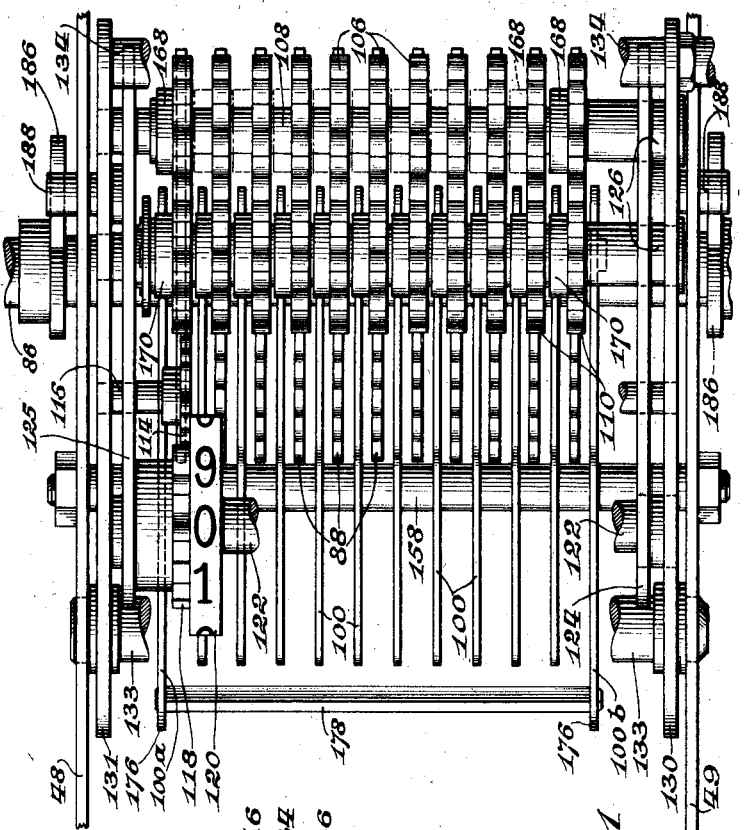
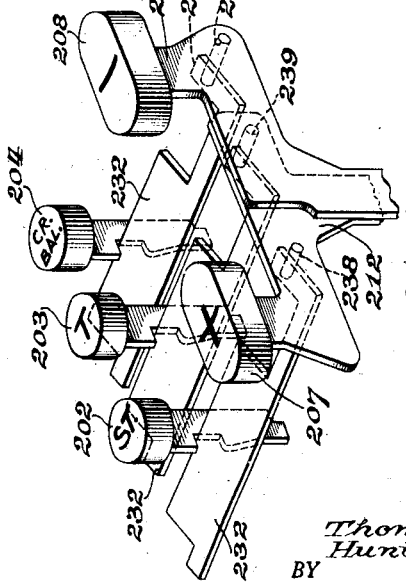
INVENTORS
Thomas O. Mehan
Hunter E. Hooe
BY
Williams, Bradbury & Hinkle
Attorneys Patented Oct. 21, 1947

2,429,522

UNITED STATES PATENT OFFICE 2,429,522

TRANSFER MECHANISM FOR CALCULATING MACHINES

Thomas O. Mehan, Park Ridge, and Hunter E. Hooe, Chicago, Ill., assignors to Victor Adding Machine Co., Chicago, Ill., a corporation of Illinois Original application March 6, 1942, Serial No. 433,608, now Patent No. 2,396,188, dated March 5, 1946. Divided and this application May 30, 1945, Serial No. 596,762

7 Claims. (Cl. 235—133)

Our invention relates generally to calculating machines, and more particularly to improvements in subtracting, positive and negative total taking, and control mechanisms for machines of this type.

The invention is an improvement upon the machine disclosed in the prior patents of Thomas O. Mehan, Nos. 2,346,265 and 2,360,005, and is a division of our copending application Serial No. 433,608, filed March 6, 1942, which has matured into Patent No. 2,396,188.

It is a primary object of our invention to provide an improved calculating machine capable of addition and subtraction (as well as division and multiplication by repeated addition and subtraction), in which positive or negative totals may be taken during the machine cycle immediately following an item entering cycle, that is, without the necessity of interposing one or more blank strokes.

A further object is to provide an improved carrying or transfer mechanism whereby transfers may be effected substantially instantaneously from the lowest—through intermediate—to the highest denominational order of the accumulator during the initial portion of a normal operating cycle.

A further object is to provide an improved calculating machine which is capable of performing a wide variety of calculating operations efficiently and rapidly, which is simple in construction, and which may be economically manufactured.

Other objects will appear from the following description, reference being had to the accompanying drawings, in which:

Fig. 2 is a fragmentary vertical sectional view, taken just inside the left outer vertical frame of the machine, and showing particularly the means for shifting the accumulator between add and subtract positions, and the means for operating the actuator restoring bail;

Fig. 3 is a fragmentary vertical sectional view, to an enlarged scale, showing the accumulator and its associated operating mechanism;

Fig. 3a is a fragmentary sectional view showing particularly the non-add latch.

Figs. 4 to 8 are fragmentary sectional views, showing portions of the transfer or carrying mechanism in the different positions assumed thereby in effecting transfers;

Fig. 9 is a right-side elevational view of a portion of the machine with the casing removed, showing particularly the control keys and linkage operated thereby;

Fig. 10 is a perspective view showing the connection between the credit balance, total, and subtotal keys and the subtract and add keys;

Fig. 11 is a plan view of the accumulator mechanism, portions thereof being omitted to reveal the underlying parts; and Fig. 12 is a timing chart showing the sequence of operations taking place during listing and total taking cycles of the machine.

General description

Figure 1:
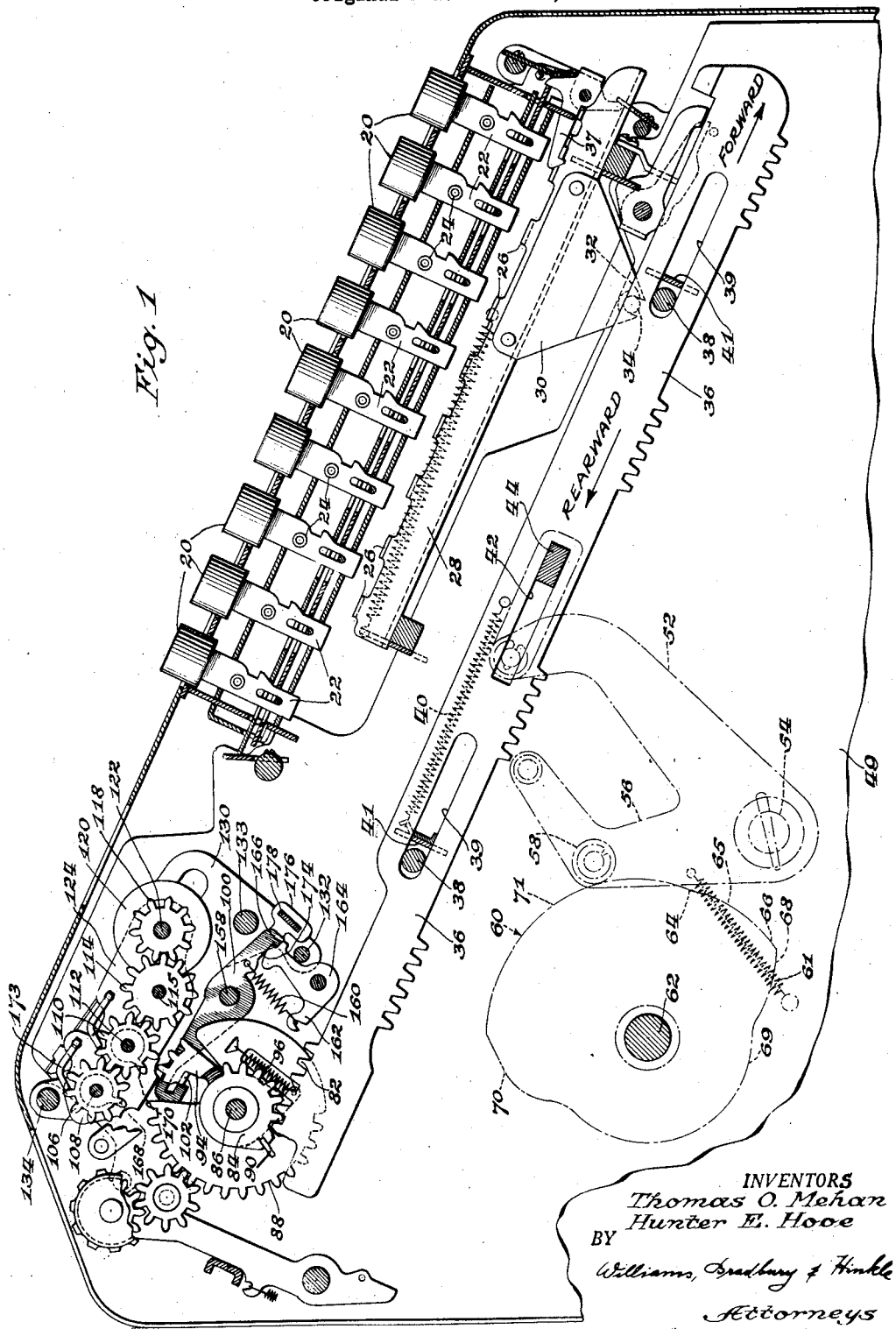
Fig. 1 is a vertical sectional view, taken from the left side of the machine, and showing the numeral keys, the accumulator, and the actuating mechanism therefor.

It is believed that the detailed description of the machine will be more readily understood if it is read with a general knowledge of the functions to be performed and the general manner in which the objects of the invention are attained.

The machine is of the key-set type, the keys controlling the positioning of actuators which operate the accumulators. Intermediate the actuator racks and the accumulators is a novel form of motion transmitting mechanism whereby transfer operations may be rapidly effected during a very short time near the beginning of an operating cycle. The accumulator pinions are shifted between add and subtract positions, depending upon which of the control keys is depressed, by electromagnetic means, which are operated substantially instantaneously upon depression of the control keys.

Means are provided automatically to add the "fugitive one" as the amount entered in the accumulator changes from a positive to a negative value, and to subtract the fugitive one from the amount in the accumulator as such amount changes from a negative to a positive value.

By virtue of the fact that the fugitive one is thus added or subtracted, and because the transfer or carry-over mechanism and the accumulator shift mechanism operate rapidly at the beginning of an operating cycle, it is possible to take a positive or negative total and clear the accumulators in the cycle of operation immediately following an item entering cycle. The necessity of taking one or more blank strokes or spacing cycles is thus avoided.

Accumulator, and actuating mechanism therefor

As shown in Fig. 1, the machine has numeral keys 20 which may be provided with any suitable flexible latching mechanism for their key stems 22, and are suitably supported and guided for vertical reciprocatory movement, the keys being returned to normal position by coil springs 24 extending through a transverse row of keys and supported intermediate the keys. The lower extremities of the key stems 22 serve as stops for cooperation with lugs 26 projecting sidewardly, alternately in opposite directions, from actuator slides 28. The stop lugs 26 are arranged in vernier fashion so as to decrease the extent of necessary longitudinal movement of the slides. Each of the slides has a bracket 30 secured thereto, these brackets being suitably offset and each provided with a notch 32 engageable with a pin 34 projecting sidewardly from an actuating rack 36. Each of the slides 28 is normally restrained from rearwardly movement (under conditions hereinafter to be described) by a zero stop hook 37. The slides in such of the denominational orders in which a key has been depressed are released by clockwise swinging of their respective zero stop hooks 37 in a conventional manner.

The actuating racks 36 are mounted for longitudinal reciprocatory movement upon a pair of fixed guide rods 38 extending through slots 39, and are laterally spaced by suitable conventional means, such as combs 41. The actuating racks 36 are normally urged to move rearwardly by tension springs 40 in the usual manner. Extending through slots 42 formed in the actuating racks 36 is a restoring bail bar 44, which is suitably guided in the center frame plates of the machine for reciprocation in the direction of the slots 42, such as by the slot 46 formed in the left-hand one of a pair of center frame plates 48, 49. A link 50 (Fig. 2) is suitably secured at each end of the restoring bar 44. The rearward ends of the links 50 are pivotally connected to arms 52, which are rigidly secured to a shaft 54, mounted for oscillation in the center vertical frame plates. The arm 52 at the left-hand end of the shaft 54 is formed integrally with an offset arm 56, which carries a follower roller 58, the latter being held in engagement with a plate cam 60 by a spring 61. The cam 60 is secured to a main shaft 62.

As will hereinafter appear, the main shaft 62 rotates counterclockwise (Fig. 2) through a complete revolution during each operating cycle of the machine. As may be observed from Fig. 2, and as indicated in the diagram of Fig. 12, the cam 60 has a depressed portion 64 followed by a slight rise 65, a dwell portion 66, a sharp fall portion 68, a dwell portion 69, a rise portion 70, and a final dwell portion 71. As a result of this shape of the plate cam 60, the restoring bar 44 moves in the following manner, as indicated in the chart of Fig. 12.

During the first 36 degrees of rotation of the main shaft, the restoring bar permits the actuating racks to be moved rearwardly (to the left, Fig. 1) from their normal position by their springs 40, which resets any tripped transfer pawls, as will appear hereinafter. As the depressed portion 64 of the cam passes the roller, the actuator racks 36 are moved forwardly, while the main shaft rotates from its 36° position to its 60° position. While the main shaft moves from its 60° position to its 75° position, the dwell portion 66 of the cam is adjacent the roller 58 and the actuating racks 36 are thus held stationary during this period.

From the 75° position to the 108° position, the sharp fall portion 68 of the cam passes the roller 58, so that the actuator racks 36 move rearwardly to the position in which they are limited by the stems of any depressed keys.

The rise portion 70 of the cam 60 commences engaging the roller 58 to move the restoring bar 44 forwardly when the main shaft is at its 243° position, such forward motion being completed when the main shaft reaches its 288° position.

As shown in Figs. 1 to 6, each of the actuator racks 36 has a rack portion 82 meshing with a segmental pinion 84. This pinion is mounted for rotation upon a shaft 86, and is keyed to a segmental gear 88 by a lug 90 partially punched from the segmental gear 88. An aligner bar 85 (Fig. 2) is provided to align the segmental gears 88 prior to effecting the printing. The bar 85 may be operated in a conventional manner as shown, for example in the aforesaid Patent No. 2,346,265.

Each of the segmental gears has cut away portions 92 to receive a transfer sector 94 having three teeth in alignment with the teeth of the segmental gear 88. The transfer sector 94 is secured to a hub 95, which is mounted for rotation on the shaft 86. The transfer sector 94 is normally urged clockwise (Fig. 4), with respect to its adjacent gear segment 88, by a tension spring 96, one end of which is suitably anchored to the gear segment 88 and the other end of which is attached to an ear 98, extending from the transfer sector 94. The transfer sector 94 is normally held a definite arcuate distance, (corresponding to the tooth pitch) from the segmental gear 88 by the stop face 99 of a transfer pawl 100. When the transfer pawl is tripped, as will hereinafter be described, the stop face 99 moves radially inwardly with respect to a stop lug 102 formed on the transfer sector 94 and permits the latter to move clockwise under the influence of its spring 96 and enter a notch 104 formed in the transfer pawl 100 (Fig. 5).

The accumulator comprises a plurality of accumulator wheels 106 (pinions) mounted for free rotation upon a shaft 108, these pinions being at all times in mesh with subtract pinions 110 mounted upon a shaft 112, and the latter, as shown in Fig. 3, meshing with idler pinions 114 mounted upon a shaft 115, the idler pinions meshing with pinions 118 attached to visible dial wheels 120 mounted for free rotation upon a shaft 122. The shafts 108, 112, 115, and 122 are rigidly secured to a pair of accumulator frame plates 124 and 125.

The ends of the shafts 108 and 112 are provided with bushings 126 located in slots 128 formed in the cradle side plates 130 and 131. The cradle side plates 130 and 131 are secured together to form a rigid cradle by rods 132, 133, and 134, the rod 133 extending beyond the outer surfaces of the cradle frame plates 130 and 131, and into suitable openings formed in the center section frame plates 48, 49, to provide a pivot for the cradle.

The cradle for the accumulators is rocked to bring the accumulator wheels 106 into mesh with the segmental gears 88 (or to bring the subtract pinions into meshing engagement, provided a substract operation is to be performed) by suitable mechanism, best shown in Fig. 3.

This mechanism comprises a link 136 pivoted on the rod 134. A lost motion pin and slot connection is provided between the lower end of the link 136 and the rearwardly extending arm 138 of a two armed lever 140, the forwardly projecting arm of which is pivotally connected to the upper end of an operating link 142. The link 142 is raised and lowered at the proper times in the operating cycle, depending upon the character of the operation performed, by suitable mechanism, such as is more fully disclosed in the aforesaid Patent No. 2,360,005.

A non-add latch 144, pivoted on the rod 134, when in the position shown in Fig. 3, prevents lost motion between the link 136 and the arm 138. This non-add latch 144 is swung rearwardly free from engagement with the pin on the arm 138 when a non-add operation is to be performed, so that the raising and lowering of the operating link 142 will be ineffective to swing the cradle.

The swinging movement of the accumulator carrying cradle is limited by a pin 146 projecting inwardly from the right center frame plate 49 and embraced in an elongated slot 148 formed in an ear 150, depending from and forming part of the cradle side plate 130. The ear 150 also has a nose portion 152 cooperable with a detent 154 pivoted on the shaft 86 and operated by a tension spring 156.

The transfer pawls 100 are pivoted on a shaft 158 carried in the center frame plates 48 and 49 and each is urged to swing clockwise (Fig. 3) by a tension spring 160 attached to the forwardly extending portion of the transfer pawl 100 and a rearwardly extending arm 162 of a transfer pawl latch 164. The latch 164 is notched at its upper end to receive the downwardly extending hook 166 at the forward end of the transfer pawl 100. Each of the accumulator pinions 106 is provided with a transfer cam tooth 168, and each of the subtract pinions 110 is similarly provided with a transfer cam tooth 170 (Fig. 4). The transfer cam teeth 168, 170 (depending upon whether an adding or subtracting operation is being performed) are adapted to contact a nose projection 172 formed on the transfer pawl 100 when a transfer is to be effected.

Such engagement causes the transfer pawl 100 to be swung counterclockwise (Fig. 3), whereupon the latch 164 associated therewith is released from the hook 166 and swings clockwise so as to hold the transfer pawl 100 in tripped position, such holding being effected by the positioning of end portion 174 of the latch 164 beneath the hook 166.

The latches 164 are restored incidental to the disengagement of the accumulator or subtract pinions from the actuators when the side plates 130, 131 of the cradle swing clockwise (Fig. 3). Under these circumstances, the rod 132 which joins these plates 130, 131, engages such of the latches 164 as have been tripped and swings them counterclockwise sufficiently to permit the transfer pawls 100 to be returned by their springs 160 to their normal positions and to permit the hook portions 166 thereon to hold the latches 164 in restored position.

Suitable detent plates 173 and 175 are provided for the accumulator pinions 106 and subtract pinions 110, respectively, to hold the pinions against rotation when they are not in engagement with the segmental gears 88. These detent plates may be operated by any suitable conventional means driven from the main operating shaft.

In order to insert the "fugitive one" and to subtract it at the proper times when the amount entered in the accumulator pinions changes from a positive to a negative value, and vice versa, the transfer pawls 100a and 100b, respectively, for the highest and the lowest denominational order accumulator pinions 106, have rearwardly extending portions 176 connected by a bar 178. This fugitive one inserting mechanism is not claimed herein and may be of any suitable well-known construction.

Accumulator shifting mechanism

As previously indicated, the frame comprising the accumulator frame plates 124, 125 is shiftable in the cradle frame plates 130, 131, to bring either the accumulator pinions 106 or the subtract pinions 110 in position for engagement with the segmental gears 88. Such shifting of these pinions is accomplished electromagnetically by a pair of solenoids 180, 182, having plungers 181 and 183, respectively. As best shown in Fig. 2, the plungers 181 and 183 are pivotally connected to the ends of the lever 184 centrally pinned to the shaft 86. Likewise secured to the shaft 86 is a pair of forked arms 186, the forked upper ends of which embrace sidewardly extending studs 188, which are secured to the accumulator frame plates 124, 125, respectively.

Thus, when the solenoid 180 is energized, the accumulator pinions 106 are brought to the position shown in Fig. 4, where they may be brought into mesh with the transfer sectors 94 and gear segments 88. When in this position, the transfer cam teeth 168 are in positions such that they may operate the transfer pawls 100 and 100a. On the other hand, when the solenoid 182 is energized, the accumulator assembly will be moved to the position shown in Fig. 1, wherein the subtract pinions 110 are in position for engagement with the transfer sectors 94 and gear segments 88, and the transfer cam teeth 170, associated with these pinions, may cooperate with the transfer pawls 100 and 100a for effecting transfer operations.

The accumulator assembly is held in the particular position to which it is shifted upon operation of either of the solenoids 180, 182, by any suitable detent.

Control keys and operating controls

Referring to Fig. 9, it will be seen that the machine is provided with a plurality of control keys, including a non-print control key 200, a non-add key 201, a subtotal key 202, a total key 203, a credit balance key 204, a repeat key 205, an error key 206, an add key 207, and a subtract key 208. The keys 200 to 206 operate in a manner more fully disclosed in the aforesaid Patents Nos. 2,346,265 and 2,360,005, to determine the character of the operating cycle to be performed. In addition, the keys 201 to 204, inclusive, are individually operable to close a switch 210, which, as is more completely disclosed in our Patent No. 2,396,188, results in the energization of the driving motor for initiation of a cycle of operation of the machine.

The add key 207 has an offset stem 212, which, at its lower end, is provided with a foot 214. Similarly, the subtract key 208 has an offset stem 216 provided with a foot 218. The key stems 212 and 216 are provided with longitudinal slots embracing guiding studs 220 and 221. An interlock finger 222 is freely pivoted on the stud 220 and has cam faces for engagement with studs 223 and 224 projecting sidewardly from the key stems 212 and 216, respectively, and prevents simultaneous depression of the keys 207 and 208.

The key 207 is adapted to be held in depressed position by a latch 226, while a similar latch 227 is provided for the subtract key 208. These latches, upon complete depression of the key 207 or key 208, are adapted to hook beneath the studs 228 or 229, respectively, to hold down the depressed key during a predetermined portion of the operating cycle. The latches 226 and 227 are adapted to be released by a reciprocatory slide 230 operated by suitable mechanism driven from the main shaft 62.

As shown in Fig. 10, the credit balance key 204 is adapted, upon depression, to swing clockwise a rocker plate 232 suitably supported in the keyboard assembly, the rocker plate 232 having a rearwardly extending arm 234 which overlies a pin 236 projecting inwardly from the key stem 216. In a similar manner, the subtotal key 202 and total key 203 are each provided with rocker plates having arms engageable with studs 238 and 239, respectively, which are secured to the adding key stem 212.

Depression of the add key 207 causes its foot 214 to close a switch 240 and thereafter to close a switch 242. In a similar manner, complete depression of the subtract key 208 causes the foot 218 of its key stem successively to close switches 244 and 246.

Closure of switch 240, as shown in our Patent No. 2,396,188, results in energization of solenoid 180, while closure of switch 244 energizes solenoid 182, to shift the accumulator provided it is not already in the correct position for the character of the operation to be performed. Closure of either switch 242 or 246 results in the initiation of an operating cycle of the machine.

*Operation*

The machine is operated in a normal manner in setting up the amount by depression of appropriate amount keys 20. While the keyboard is indicated as of the full flexible type, it will be readily understood that this is not essential and that a ten-key amount-setup mechanism may be employed.

After setting up the amount, the operator depresses either the add key 207 or the subtract key 208, depending upon the character of the operation to be performed. If for example, the preceding operation has been a subtract operation and the operator depressed the add key 207, the initial portion of the downward stroke of the add key 207 results in closure of the switch 240. As previously described, closure of the switch 240 would, in this instance, result in the energization of the solenoid 180. The accumulator pinions 106 are thus in the positions shown in Figs. 4, 5, 7, and 8.

Further depression of the add key 207 results in the closure of drive motor control switch 242. The motor will thus commence driving the main shaft 62 through the usual one revolution clutch mechanism and, by means of the cam 60 (Fig. 2) move the restoring bail bar 44 rearwardly a short distance sufficient to move the segmental gears 88 from the positions in which they are shown in Fig. 4 to the positions shown in Fig. 6. In this position, the gear segment 88 is in contact with the transfer sector 94, and holds the latter sufficiently counterclockwise from its normal position to permit any of the transfer pawls 100 which may have been moved to transfer position in a preceding cycle (as in Fig. 5), to swing from the dotted line position of Fig. 6 to the full line position. Such restoratiton of any previously actuated transfer pawls 100, 100a, is permitted, since at this time the accumulator cradle frame plates 130 and 131 are in the position shown in Fig. 3, in which, it will be noted, the transfer pawl latches 164 are swung sufficiently counterclockwise to permit the springs 160 to move their respective transfer pawls 100, 100a, to normal position.

Following restoration of the transfer pawls 100, 100a, and after the main shaft has rotated through 36°, the actuator restoring bail bar 44 will, as previously described, commence moving forward until at the 60° position of the main shaft, the gear segments 88 and transfer sectors 94 will be in their normal positions shown in Fig. 4. After being held in this position from a 60° to a 75° position of the main shaft, such of the racks as have been released by their zero stops 37 (due to the depression of a key in the associated bank of keys) will move rearwardly with the restoring bail bar 44 until arrested by the depressed key stems. As indicated in Fig. 12, all of the racks will have moved rearwardly to the limit permitted by their associated set keys when the main shaft has rotated through 108°. When in this position, the segmental gears 88 are locked in aligned position by the aligner bar 85, and, after the main shaft has moved to its 207° position, the accumulator pinions 106 are rocked into engagement with the gear segments 88.

As the main shaft reaches its 231° position, the accumulators will be fully enmeshed with the gear segments 88 so that at the 234° position of the main shaft, the aligner bar 85 may be, and is, moved from engagement with the segmental gears 88. At the 243° position of the main shaft, the aligner bar will be fully disengaged and the restoring bail bar 44 will commence moving forward, and reaches its normal forward position when the main shaft is at its 288° position. During the course of such movement, the actuating racks 36 which have been displaced due to the operation of a numeral key in their associated key banks will be successively "picked up" by the restoring bail 44 and returned to normal position, where they will be relatched by their zero stop hooks 37.

If, in the course of the forward movement of the actuator racks 36, one of the accumulator pinions 106 is rotated from its 9 to its 0 position, its transfer cam tooth 168 trips the transfer pawl 100 or 100a associated with the next highest denominational order so that the latter moves from the full line to the dotted line position of Fig. 6. The transfer sector 94 of the order into which the transfer is effected is thus permitted to be restored with its segmental gear 88 to the position in which it is shown in Fig. 5, and the accumulator pinion 106 in mesh therewith will thus be advanced an additional tooth space since the transfer sector 94 forms in effect a continuation of the gear segment 88.

After the main shaft reaches its 348° position, the accumulator pinions 106 are moved away from the segmental gears 88 and transfer sectors 94 so that as the cycle of operation is completed the accumulator pinions will again be in the positions in which they are shown in Figs. 4 and 5 and will have had the amount set up on the keyboard added to the registration which may have initially been contained therein.

It will be noted that in an ordinary listing operation (as well as other types of operating cycles to be described hereinafter), the transfer pawls 100, 100a are reset during the initial 60° movement of the main shaft so that transfer operations may be rapidly performed during the limited time that the accumulators are in engagement with their actuating gears 88 and transfer sectors 94. Furthermore, it will be noted that the movement of the transfer sectors 94 is effected by the springs 96, and that because of the relatively light weight and low rotary moment of inertia of the transfer sectors 94, these parts may move rapidly to the position in which they effect a transfer (i. e., from the position of Fig. 4 to that of Fig. 5). Thus, for example, if the accumulator contained the registration of the amount 999,999,999.99 prior to the start of the adding cycle, it will be apparent that if the amount added during the adding cycle was 1, all of the transfer pawls will have to be tripped. The energy for tripping the pawls 100, 100a, and for rotating the accumulator pinions each through one step and effecting a transfer of the type indicated, is obtained from the stretched springs 96. Thus, the mechanism is capable of performing successive transfer operations from the units to the highest order accumulator pinion without requiring the movement of relatively heavy parts having considerable inertia, which would tend to slow down the transfer operation.

In performing a subtract operating cycle, the operator presses the keys representing the amount to be subtracted and follows this with the depression of the subtract key 208. The initial downward movement of the key 208 results in closure of the switch 244, which completes a circuit through the solenoid 182.

As the latter is energized, the accumulator assembly is shifted from the position in which it is shown in Figs. 4 and 6 to the position in which it is shown in Figs. 1 and 3, in which position the subtract pinions 110 are in position to be engaged with the segmental gears 88 and transfer sectors 94.

Further depression of the subtract key 208 results in closure of the switch 246, which completes the circuit to the one revolution clutch mechanism solenoid 260 in the same manner as was previously described as occurring upon the closure of switch 242.

The operating cycle of the machine commences, and all parts operate in the same manner as previously described with reference to the adding cycle, except that the subtract pinions 110, instead of the accumulator pinions 106, are brought into mesh with the gear segments 88 and transfer sectors 94, and the transfer pawls 100, 100b are actuated by the transfer cam teeth 170 of the subtract pinions 110 instead of by the corresponding transfer cam teeth of the accumulator pinions. Since the subtract pinions 110 are geared directly to the accumulator pinions 106, the amount set up on the keyboard will be subtracted from the registration contained in the accumulator pinions in the well known manner.

To illustrate a simple example involving a negative total, that is, a true total obtained when a greater amount is subtracted from a lesser amount, 4 subtracted from 3, for instance, the following operations occur: Assume that 3 has been entered into the units accumulator pinion 106, as illustrated in Fig. 7, with its transfer cam tooth 168 in the position there shown. Then assume that digit 4 is set up in the keyboard, followed by a depression of the subtract key 208, to perform a subtract operating cycle, in the manner previously described.

It will be recalled that the initial portion of the downward stroke given subtract key 208 results in shifting the subtract pinions 110 to proper position for meshing with the segmental gears 88 and transfer sectors 94 if, as in the present example, the preceding cycle was an adding operation. Thus, the units subtract pinion 110 will be in position to mesh with the units segmental gear 88 (Fig. 3), and when so meshed, will be rotated four toothed spaces counterclockwise during the subtract cycle by virtue of the digit 4 set up in the keyboard. During such four toothed rotation of the unit subtract pinion 110, its associated transfer cam tooth 170 will trip its transfer pawl 100 when said pinion 100 moves between its 9 to 0 position to effect a transfer into the next highest denominational order subtract pinion. Such transfer operation accordingly takes place successively through the higher denominational order subtract pinions 110 until the tooth 170 of the highest denominational order pinion 110 trips its associated transfer pawl 100a (Fig. 11). When this pawl 100a is tripped, the transfer pawl 100b is likewise tripped through a tie bar 178, and the units order subtract pinion 110 is thereby moved one additional toothed space to enter the fugitive one in the subtract pinion 110 of lowest order. At this time, the registration in the subtract pinions 110 will read 000,000,000.01.

It may be convenient at this time to refer to the corresponding operation of the accumulator mechanism as the registration in the accumulator is changed from a negative value to a positive value. Such change would, of course, occur while the accumulator pinions 106 are in mesh with the actuating gear segments 88 or transfer sectors 94. With a registration of 999,999,999.99, all of the transfer cam teeth 168 of the accumulator pinions 106 will be in position about to trip their associated transfer pawls 100, 100a. Thus, any further (counterclockwise, Fig. 4), movement of the units accumulator pinion 106 will trip the tens order transfer pawl 100 and advance the tens accumulator pinion 106 one tooth counterclockwise. This transfer will be carried through, in similar manner, to the highest order accumulator pinion 106, and from the latter to the units order accumulator pinion thus reinserting the fugitive one.

When a subtotal is to be taken, the subtotal key 202 is depressed. Depression of this key through its rocking plate 232 operating upon pin 238 depresses the key stem 212 of the add key 207, and, in the manner previously described sufficiently to close switch 240, thereby shifting the accumulator assembly to the add position (if it was not previously in that position) and subsequently by closure of switch 210 energizing the driving motor to start an operating cycle.

As the main shaft 62 reaches its 60° position, the accumulator pinions 106 are moved into mesh with the gear segments 88 and transfer sectors 94, and are retained in mesh throughout the rearward and forward travel of the actuating racks, being disengaged from the gear segments 88 and transfer sectors 94 as the main shaft reaches its 231° position.

In the subtotaling operation, the zero hooks 37 are operated to release all of the actuating racks in the usual manner so that their movement may be limited by the engagment of the radial faces of the transfer cam teeth 168 with the cooperating surfaces of the noses 172 of the transfer pawls 100, 100a, all in a well known manner, so that printing of the subtotal may be effected.

In effecting a total operation, the total key 203 is operated, and an operating cycle corresponding closely with that described above with reference to taking a subtotal is performed by the machine, with the exception that the accumulator pinions 106 are disengaged from their gear segments 88 and transfer sectors 94 as the main shaft 62 moves from its 207° to its 231° position so that the accumulator is cleared.

It will be understood that neither a total nor a subtotal operation can be performed by the machine while a credit balance or overdraft is present in the accumulator. Such operation may be prevented by any well known overdraft locking mechanism. When a credit balance is present in the accumulator and it is desired to print the credit balance and clear the machine, the credit balance key 204 is depressed. During the initial portion of the downward stroke of the key 204, it will, through the rocking plate 232, its arm 234, and pin 236, depress the subtract key stem 216 sufficiently to cause closure of the switch 244, thereby assuring that the accumulator assembly will be in its subtract position, energizing the solenoid 182 if necessary to thus shaft the accumulator assembly. Such shifting is necessary whenever the preceding cycle of the machine was an adding cycle.

Further depression of the credit balance key 204 results in closure of the switch 210 and consequent initiation of an operating cycle. In the course of the credit balance operating cycle, just as in the subtotaling and totaling cycles, the zero hooks 37 are released during the operating cycle to permit the actuating racks 36 to move rearwardly to an extent determined by the positions of their associated subtract pinions 110. The rotation of the subtract pinions 110 is limited by the engagement of the radial faces of their transfer cam teeth 170 with the cooperating faces of the noses 172 of the transfer pawls 100, 100a. When all of the subtract pinions have been arrested in this position, the accumulator pinions 106 are in positions corresponding to a registration of 999,999,999.99. This might be termed a "negative zero" position of the accumulator pinions 106 since when in this position, if a unit is added in the units wheel, it will effect a successive transfer to the highest order wheels, first setting all of the wheels to zero position, and then, due to the rigid connection between the transfer pawls 100a and 100b, the unit will be entered into the units accumulator pinion by way of the transfer mechanism.

From the foregoing, it will be apparent that due to the rigid connection between the transfer pawls 100a and 100b, there is a possibility of erroneous addition by the amount of "1" for each time the capacity of the machine is exceeded in a single series of adding cycles, because after the full capacity of the machine, namely, 999,999,999.99, is reached, the addition of 1 will result in causing the accumulators to register 000,000,000.01, whereas, the indication should have been 000,000,000.00. However, this possibility of error is extremely remote and is of no more consequence than the possibility of error in the use of any adding or calculating machine whenever the capacity of the machine is exceeded.

*Résumé*

From the foregoing, it will appear that the machine of our invention is so constructed that a subtotal, a total, or a credit balance may be taken at any time, that is, during a cycle of the machine immediately following an add or subtract cycle. The factors which make this possible include the manner of resetting the transfer mechanism, whereby this is accomplished during the first 60° of rotation of the main shaft, and the utilization of a means for shifting the accumulator between its add and subtract positions which is operable prior to the commencement of, or at least during the first few degrees of, the operating cycle.

The transfer mechanism, in which energy is stored and released to effect transfer operations with the movement of small low inertia parts, and the actuator operating means, whereby the resetting of the transfer mechanism is effected early in an operating cycle of the machine, contribute materially to the simplicity and speed of operation of the machine.

While we have shown and described a particular embodiment of our invention, it will be understood by those skilled in the art that the invention may be embodied in various modified forms, and we therefore desire, by the following claims, to include within the scope of our invention, all such variations and modifications by which substantially the results of our invention may be obtained through the use of substantially the same or equivalent means.

We claim:

1. In a calculating machine having actuators differentially positionable under the control of selectively set keys, an accumulator differentially operable by said actuators, a transfer mechanism associated with said accumulators, means operated by the actuators to restore the transfer mechanism to normal position and means to reciprocate said actuators through a relatively small excursion of sufficient extent to restore the transfer mechanism to normal position prior to the time in the operating cycle that said actuators are reciprocated to effect a total taking, sub-total taking, adding, or subtracting operation of the machine.

2. In a calculating machine having an accumulator and a plurality of actuator racks for operating the accumulator, means for resiliently urging said racks in one direction, a restoring bail, and means for operating said restoring bail during each complete cycle of operation of the machine to cause the latter to permit movement of said racks in two reciprocatory excursions with the first of said excursions of amplitude slightly more than necessary for the entry of unitary digits in said accumulator, and the second of said excursions of sufficient amplitude to permit movement of said actuators through their maximum strokes.

3. In a calculating machine having an accumulator provided with transfer device and a plurality of actuators for operating the accumulator, the combination of means individual to said actuators for yieldingly urging them in one direction from normal position, an element for moving said actuators in the opposite direction, and means for moving said element in two reciprocatory excursions during each operating cycle of the machine, the first of the excursions being a small amplitude sufficient to restore the transfer device and the second excursion of sufficient amplitude to permit movement of said actuators through their maximum strokes.

4. In a calculating machine having movable numeral stops, an accumulator, actuators for operating the accumulator in response to the setting of the stops, a quick acting transfer mechanism associated with the accumulator, said transfer mechanism including for each denominational order pawls which are tripped during adding or subtracting operations of the machine when a carry-over or transfer is required, means operated by the initial movement of said actuators to reset any of said pawls which have been tripped during a preceding cycle, and means to impart to said actuators an initial oscillatory movement of sufficient extent to reset the tripped transfer pawls and thereafter impart to said actuators an oscillatory movement of extent necessary to effect actuation of the accumulator.

5. In a calculating machine having movable numeral stops, an accumulator, actuators for operating the accumulator in response to the setting of the stops, a transfer mechanism associated with the accumulator, said transfer mechanism including parts which are tripped during adding operations of the machine when a carry-over or transfer is required, means operated by the initial movement of said actuators to reset any of said parts which have been tripped during a proceding cycle, and means to impart to said actuators an initial to and fro movement of sufficient extent to reset the tripped parts and thereafter to impart to said actuators a to and fro movement of extent necessary to effect actuation of the accumulator.

6. In a calculating machine having an accumulator, actuators for operating the accumulator, a transfer mechanism associated with the accumulator, said transfer mechanism including trippable pawls, means operated by initial movement of said actuators during each operating cycle of the machine to reset any of said pawls which have been tripped during a preceding cycle, and means to impart to said actuators an initial movement of sufficient extent to reset the tripped transfer pawls and thereafter impart to said actuators a movement of extent necessary to effect actuation of the accumulator.

7. In a calculating machine having movable numeral stops, an accumulator, actuators for operating the accumulator in response to the setting of the stops, a quick acting transfer mechanism associated with the accumulator, said transfer mechanism including for each denominational order pawls which are tripped during adding or substracting operations of the machine when a carry-over or transfer is required, means operated by initial movement of said actuators to reset any of said pawls which have been tripped during a preceding cycle, and a cam to impart to said actuators an initial movement of sufficient extent to reset the tripped transfer pawls and thereafter impart to said actuators a movement of extent necessary to effect actuation of the accumulator.

THOMAS O. MEHAN.
HUNTER E. HOOE.

REFERENCES CITED

The following references are of record in the file of this patent:

UNITED STATES PATENTS

| Number | Name | Date |
|---|---|---|
| 1,812,129 | Barrett | June 30, 1931 |